Feb. 22, 1966 J. L. REGER ETAL 3,236,691
REGENERABLE FUEL CELL
Filed June 20, 1961 2 Sheets-Sheet 1
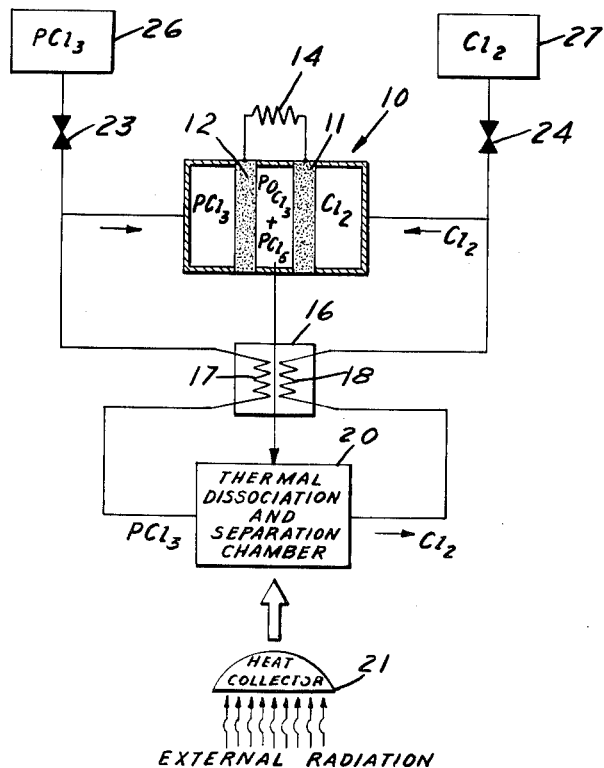
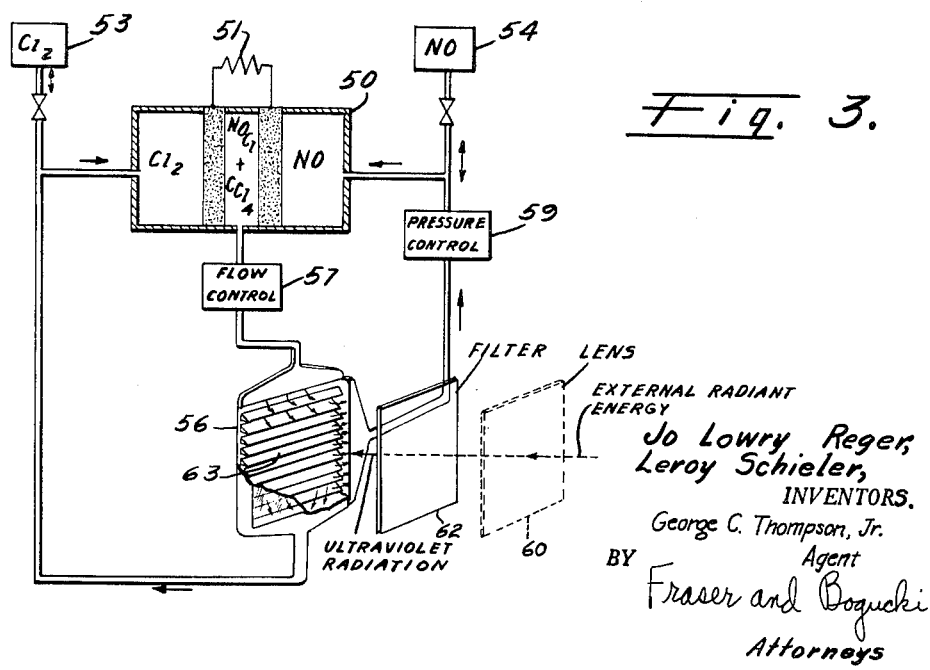
Jo Lowry Reger,
Leroy Schieler,
George C. Thompson, Jr.
INVENTORS.
BY Fraser and Bogucki
Agent
Attorneys

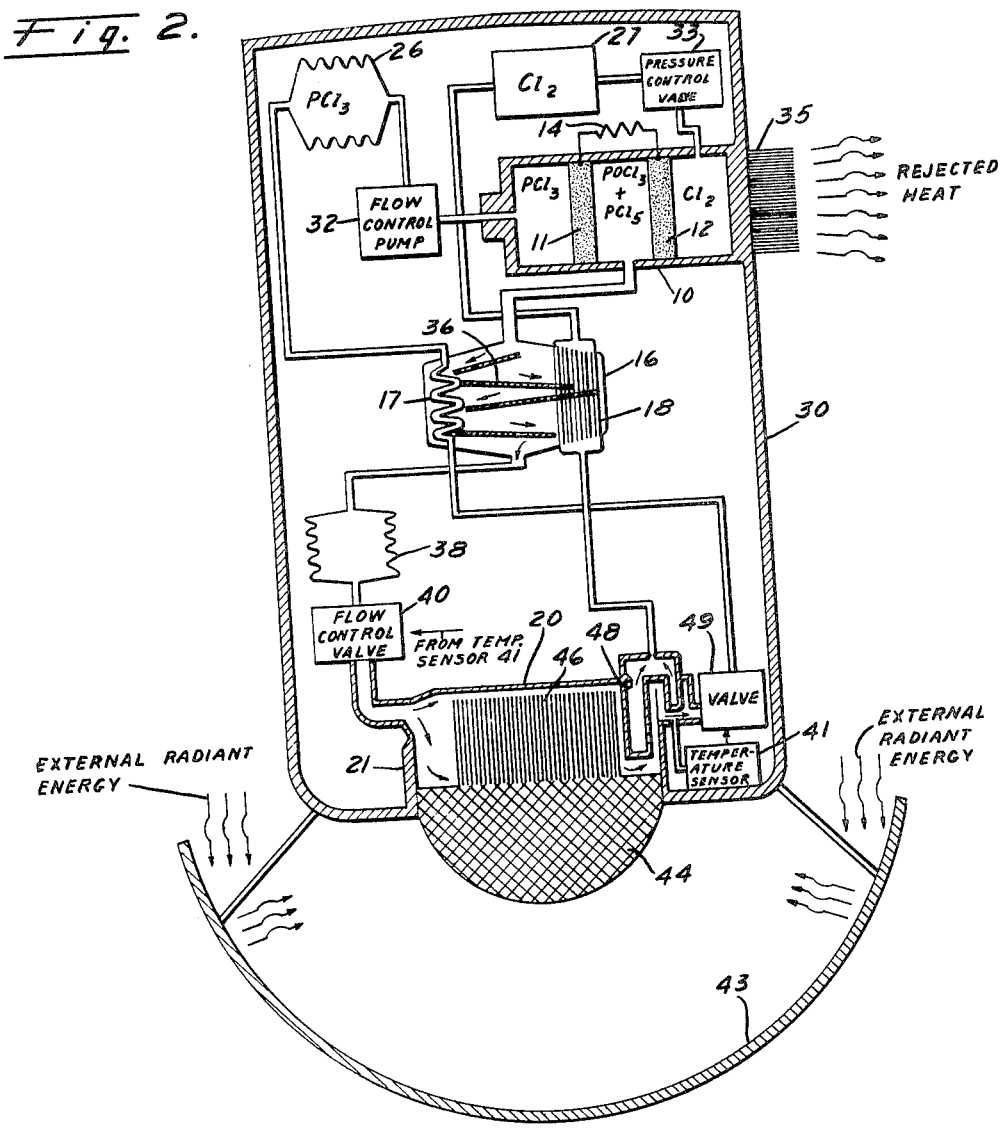

United States Patent Office 3,236,691
Patented Feb. 22, 1966

3,236,691
REGENERABLE FUEL CELL
Jo Lowry Reger, Redondo Beach, and Leroy Schieler, Playa Del Rey, Calif., assignors, by mesne assignments, to TRW Inc., a corporation of Ohio
Filed June 20, 1961, Ser. No. 118,338
2 Claims. (Cl. 136—86)

This invention relates to devices which derive electrical energy directly from chemical reactions, and more particularly to electrochemical combustion processes in which the fuels are regenerated from the products of combustion.

It has been known for many years that chemical energy may, under proper conditions, be converted directly into electrical energy. "Fuel cells" based upon this knowledge are currently used for a number of purposes, particularly for generation of relatively small amounts of electrical power at sites which are remote from conventional sources of power. Much work has gone into developing different types of fuel cells for various applications. Some cells, commonly called "hydrox" cells, utilize reactions of hydrogen and oxygen (at porous electrodes) to derive an electrical current. High temperature gas cells use reducing fuels such as gaseous hydrocarbons and solid cast electrolytes which are molten at operating temperatures. Still other "redox" cells utilize intermediate solutions which are reacted at the electrodes to yield electrical power and then are regenerated externally to the cell by reaction with the primary fuel.

In these and other forms, the fuel cell has a high potential thermodynamic efficiency and therefore great promise as a power generator. Usually, the fuels which are used can be stored in volume adjacent to the fuel cell and supplied over a period of time to sustain the reaction. Regeneration of the fuels from the products of combustion in the above mentioned types of cells would be desirable but is usually not feasible. Even if the fuels are regenerable, which they usually are not, the porous or permeable electrodes or membranes are likely to become obstructed during operation, or adversely affected by heat or chemical activity. Small amounts of impurities may ultimately cause poisoning of the electrodes. With these and other difficulties, the equipment needed for the regenerative part of a process may be far more complex than the part which derives the electrical energy directly.

Nevertheless, much attention has been directed to regenerable fuel cells for a number of reasons. First, for some uses the significant figure of merit is the power which is produced per pound of fuel cell over a long period of time and not the energy content of the fuel per pound of fuel. For example, in remote and unattended installations, as in space vehicles, certain amounts of electrical energy may be needed for long periods of time. Only a relatively low voltage direct current supply may be needed, for example, but the total energy required over a long time span may far exceed the weight or volume which can be devoted to the cell and the supply fuels. Accordingly, if fuel cells are to be effective in such applications, they must be capable of regenerating the fuels which are used. Furthermore, the regeneration process must efficiently use the forms of energy which are available. In a space vehicle, the energy might be solar heat or solar radiation in the infrared, ultra-violet or visible wave length regions.

A number of investigations have been carried out by workers in the art with the objective of providing a regenerable fuel cell. In some instances the products of combustion have been separated by electrolysis, through use of current derived from solar cells. Solar cells have, at best, a limited efficiency and so the overall efficiency of the system which uses them is inherently restricted. It would be far preferable to use the available heat or radiation in a direct conversion process. Thermally regenerable systems are known, but these employ molten solid electrolytes and operate at elevated temperatures. Under these conditions there is apt to be severe electrode deterioration and very low conversion efficiency. These are not all of the difficulties to be overcome. Systems heretofore contemplated have involved relatively complex separation equipment in order that the fuels might be regenerated. Accordingly, the systems are of considerable weight and size and suffer from loss of reliability. Virtually no regenerable system heretofore known has been able to provide sufficient power for use in driving useful electronic equipment over an extremely long period of time.

It is therefore an object of the present invention to provide an improved regenerable fuel cell.

Another object of the present invention is to provide an improved system for continuous direct conversion of chemical energy to electrical energy, using available primary energy sources to regenerate the chemical fuels.

Yet another object of the invention is to provide an improved regenerable fuel cell having a relatively high power output per unit weight and utilizing a direct conversion of the products of reaction into constituent fuels.

A further object of the invention is to provide a relatively high output, regenerable fuel cell in which the fuels are readily separable when regenerated by direct conversion from available energy sources.

Regenerable fuel cells in accordance with the invention utilize externally derived energy to break the products of reaction into the constituent fuels. The process is carried out by generating the constituent fuels in different phases upon dissociation, so that separation of the constituent fuels may be realized simply and efficiently.

One specific example of a system in accordance with the invention is provided by a regenerable phosphorous trichloride-chlorine fuel cell. Phosphorous trichloride in solution is introduced at one electrode and gaseous chlorine is introduced at the other. In the combustion reaction, phosphorous pentachloride is formed and rejected from the cell into a decomposition chamber as electrical power is derived from the electrodes of the fuel cell. In the decomposition chamber, the phosphorous pentachloride is thermally dissociated in its solvent by heat derived from an external source. The dissociation provides phosphorous trichloride in the liquid phase and chlorine in the gaseous phase. These components are recirculated to be re-entered into the fuel cell system.

One feature of arrangements in accordance with the invention is the use of a heat exchange relationship between the reaction products provided from the fuel cell and the constituent fuels after dissociation. By this means, the reaction products are preheated prior to entering the dissociation chamber, while cooler constituent fuels are provided for best efficiency to the fuel cell.

Another feature of systems in accordance with the invention is the use of a polar solvent for one of the constituent fuels and in the electrolyte. The polar solvent strongly ionizes the products of reaction and facilitates its solution into the solvent; and an appreciable increase is obtained in the voltage derived from the cell.

In another system in accordance with thte invention, a regenerable fuel cell is provided which utilizes nitric oxide and chlorine as fuels, and obtains nitrosyl chloride as the combustion product. The nitrosyl chloride in a suitable solvent is dissociated into the constituent fuels under ultraviolet radiation, with the nitric oxide being dissociated in gaseous form while the chlorine remains in solution.

A better understanding of the invention may be had by reference to the following description, taken in conjunction with the accompanying drawings, in which:

FIG. 1 is a simplified block diagram representation of a thermally regenerable fuel cell system of the invention utilizing phosphorous pentachloride as the combustion product;

FIG. 2 is a simplified diagrammatic representation of the elements of such a thermally regenerable fuel cell using phosphorous pentachloride; and FIG. 3 is a block diagram of a regenerable fuel cell of the invention using nitrosyl chloride.

A regenerable fuel cell system in accordance with the invention, referring now to FIG. 1, may use an electrode-electrolyte system of the phosphorous trichloride-chlorine type. The electrode reactions of this type of fuel cell are as follows:

Anode: $PCl_3 \rightarrow PCl_3^{++} + 2e^-$
Cathode: $Cl_2 + 2e^- \rightarrow Cl^-$
Overall reaction: $PCl_3 + Cl_2 \rightarrow PCl_5$ In the electrolyte, the ionizing reaction is:

$$2PCl_5 \rightarrow [PCl_4]^+ + [PCl_6]^-$$

In the fuel cell 10 part of the overall system of FIG. 1, a catalytic graphite cathode 11 absorbs the chlorine reactant, which accepts electrons and goes into solution as chloride ions. The phosphorous trichloride is absorbed at the anode 12, where it gives up electrons and combines with the chloride ions in the electrolyte.

Current flow through an external load 14, shown schematically, supplies electron transfer between the anode and cathode electrodes during the combustion reaction. Open circuit potentials for such a system vary, but as will be shown below are at or above 0.28 volt at approximately 1 atmosphere and approximately 300° K. Under these conditions, the $PCl_5$ which is formed is a solid. Accordingly, an electrolyte is selected which maintains the $PCl_5$ in solution, a suitable solvent for this purpose being phosphorous oxychloride, $POCl_3$.

The reaction product, $PCl_5$, which is dissolved in the electrolyte is rejected from the center of the cell, along with the solvent, to a heat exchanger 16. Heat exchange passages 17 and 18 within the heat exchanger 16 carry the dissociated fuel constituents back through to the fuel cell 10 so that the temperature of the rejected products of combustion is somewhat increased, while the temperature of the constituent fuels after dissociation is somewhat decreased. From the heat exchanger 16 the products of combustion are directed into a dissociation chamber 20, in which thermal energy is accumulated by a collector device 21. The latter device 21 is exposed to solar or other external sources of radiation or heat.

In the dissociation chamber 20 the reaction products are heated to a sufficient temperature and pressure for the $PCl_5$ to be thermally dissociated to gaseous chloride and to liquid phosphorous trichloride, the latter remaining in solution in the solvent. The solvent is also held in the liquid phase during and after the dissociation. Separation of the gaseous chlorine from the liquid constituents thus provides a return flow of the regenerated initial constituent fuels. Prior to the return to the system, however, the $PCl_3$ and $Cl_2$ are passed through the heat exchange passages 17 and 18 and the heat exchanger 16, so as to give up heat to the newly ejected reaction products. Thereafter, the fuel constituents may be directed into the fuel cell 10, or through two-way valves 22, 24 back into separate source chambers 26, 27 for the $PCl_3$ and $Cl_2$ respectively.

The regenerable fuel cell illustrated in general form in FIG. 1 can operate on a continuous basis to provide a difference in potential across the load 14. In one mode of operation, during which the collector 21 may not be receiving sufficient heat from the external source to effect the thermal dissociation, the primary fuels in the source chambers 26 and 27 are used alone. In this mode the rejected reaction products may simply be accumulated during power generation, until such time as sufficient heat becomes available from the external sources. The use of the heat content of the fuels after dissociation to increase the temperature of the reaction products in the heat exchanger 16, however, markedly reduces the time needed to bring the temperature of the reactants in the dissociation chamber 20 to the level needed for proper reaction.

In a second mode of operation, there is sufficient heat available to effect thermal dissociation of the reaction products. During these intervals, a constant flow of the constituent fuels is maintained back through the heat exchanger 16 to the fuel cell 10. In addition, dissociated products in excess of those needed for continuation of the combustion reaction in the fuel cell 10 are returned through the valves 23, 24 to the respective source chambers 26, 27. Thus any extra demand on the source chambers during periods in which insufficient external radiation is available for continuous dissociation of the reaction products is compensated for by returning the fuels to the source chambers 26, 27 during the period when adequate external radiation is received. For any specific application, of course, the collector device 21 will be arranged to be of sufficient capacity and to have sufficient exposure to provide adequate energy for continuous operation on the long term basis which is desired.

With these principles of operation in mind, more detailed aspects of a system in accordance with the invention will be appreciated by reference to the diagrammatic representation of FIG. 2.

The operative elements are contained in a system chamber 30 which is preferably hermetically sealed and which contains desiccant materials or is purged with dry nitrogen or carbon dioxide to minimize water vapor within the chamber 30. Although the various operative elements are sealed, there is still the likelihood of hydrolysis of the reactants with any moisture unless these precautions are taken. In addition, the interior surfaces of the various chambers and piping which come in contact with the reactants are made of non-corrosive materials such as stainless steel, carbon and glass.

The system shown in FIG. 2 is intended to operate in any altitude and independently of any requirement for gravity flow. Accordingly, the source chamber 26 for the phosphorus trichloride is in the form of an expandable bellows reservoir, the volume of which automatically contracts or expands to conform to the volume of liquid contained therein. $PCl_3$ taken from the source chamber 26 is applied to the fuel cell 10 through a flow control pump 32, while gaseous chlorine is applied to the appropriate chamber of the fuel cell 10 from the source chamber 27 through a pressure control valve 33. Although the flow rate of the $PCl_3$ and the pressure of the $Cl_2$ may be preset to selected levels, so as to sustain the combustion reaction at a selected rate, the flow rate and the pressure level may also be adjusted by individual sensors, or by appropriate circuitry (not shown) coupled to the load 14. The fuel cell 10 itself is physically connected by thermally conductive elements to a heat rejector 35 having a face which is external to the system chamber 30 and which is finned or otherwise appropriately configured to give up heat to the surrounding environment so as to cool the fuel cell 10.

The heat exchange chamber 16 which is coupled to receive the reaction products from the fuel cell 10 may include a heat exchange passage 17 for the liquid $PCl_3$ in the form of a helical coil. The heat content of the gaseous $Cl_2$ may be made available by passage through thin hollow tubes connected to headers at each end of the heat exchange chamber 16 and forming the separate heat exchange passage 18. Baffles 36 within the heat exchange chamber 16 may direct the reaction products in a sinuous flow past the heat exchange passages 17, 18, so as to improve the heat exchange and to obtain a higher final reaction product temperature.

From the heat exchange chamber 16, the reaction products may pass through an expandable reservoir 38 and a flow control valve 40 to the thermal dissociation chamber 20. The expandable reservoir 38 provides a buffering action between the fuel cell 10 and the dissociation chamber 20 for those intervals in which the dissociation chamber 20 temperature may be insufficiently high to carry out the dissociation at a normal rate. The flow control valve 40 is arranged for this purpose to be controlled by a temperature sensor 41 which is coupled, as by thermocouples or like temperature sensing elements, to the highest temperature region of the dissociation chamber 20.

In the present instance it is desired to utilize thermal energy derived from radiant energy, as for example solar radiation. The external radiant energy is accordingly focused by an optical system, which in this case may be a silvered parabolic mirror 43, onto an absorptive collector element 44 fixed to the combustion chamber 20. Internal fins 46 having high heat conductivity are mounted on the element 44 to project into the thermal dissociation chamber 20. The collector-absorber system 21 is not, of course, drawn to scale, but may be made relatively much larger where higher heat collection requirements are imposed.

At the exit end of the dissociation chamber 20, the constituent fuels in their respective liquid and gaseous phases are caused to follow a serpentine path through a semi-permeable membrane system 48. The semi-permeable membrane system 48 provides an extremely large surface area for thorough mixing of the liquids, so that the gaseous $Cl_2$ passes through the membrane surfaces to be collected into a piping system which is coupled to the heat exchanger 16 and thence back to the $Cl_2$ source chamber 27. The liquid $PCl_3$ and liquid solvent, thus purified of gases, pass out of the membrane system 48 through a valve 49 to the associated heat exchanger passage 17 in the heat exchanger 16 and back ultimately to the source chamber 26 for the $PCl_3$. The valve 49, like the flow control valve 40 which is prior to the dissociation chamber 20, is controlled by the temperature sensor 41. Thus a selected pressure difference may be maintained within the dissociation chamber 20, and the rate of flow through the dissociation chamber 20 may be regulated in proportion to the temperature at which the reaction products are maintained in carrying out the dissociation.

The arrangement of FIG. 2 operates as a regenerable fuel cell having a relatively high output potential and a substantially continuous operation over a long period of time. Under a starting condition of operation, $PCl_3$ is fed from the source chamber 26 by the flow control pump 32 to one electrode of the fuel cell 10, and gaseous $Cl_2$ is passed through the pressure control valve 33 to the other electrode of the fuel cell 10. As the combination of the constituent fuels takes place in the electrolyte while a potential difference is provided across the load 14, the reaction products are directed through the heat exchanger 16 into the expandable reservoir 38. During this starting mode of operation, the reaction products are unheated and the temperature in the dissociation chamber 20 may not be at the level needed to carry out the dissociation reaction. Accordingly, the flow control valve 40 is maintained closed until such time as an adequate temperature level is reached because of heat derived from the concentration of the radiant energy on the absorptive collector 44. Then, the reaction products are permitted to pass from the reservoir 38 into the dissociation chamber 20, and brought to dissociation temperature by the heat exchange relationship with the fins 46 of the collector 44 while a sufficiently high pressure is maintained within the chamber 20.

The electrolyte, the solvent and the constituent fuels are arranged in this system to be separable and stable throughout the different phases of the sequence. For complete dissociation of the $PCl_5$, the pressure within the dissociation chamber 20 is maintained at or in excess of 1 atmosphere while the temperature is brought to approximately or in excess of 300° C. Under these conditions, the $Cl_2$ is held in a gaseous state, and the $PCl_3$ and $POCl_3$ remain in the liquid state. The $PCl_5$, which is a solid at the temperature at which it was ejected from the fuel cell 10, but in solution in the $POCl_3$, is thus completely dissociated.

Upon dissociation, the constituent fuels are returned to the separate source chambers. The gaseous $Cl_2$ is returned to the $Cl_2$ source chamber 27, a check valve being used at the chamber 27 if desired. The liquid $PCl_3$ and $POCl_3$ are likewise returned to the source chamber 26.

An important feature which is provided in accordance with the present invention is the use of a solvent which enhances the degree of ionization of the electrolyte, here $PCl_5$. The $POCl_3$, given by way of example only, acts as a polar solvent for the $PCl_5$, ionizing the $PCl_5$ as follows:

$$2PCl_5 \rightarrow (PCl_4^+)(PCl_6^-)$$

The $PCl_5$ in solution thus functions as an electrolyte which circumvents some of the concentration polarization problems which often limit the power output of fuel cells.

As the $PCl_5$ is dissociated from the solution, the concentrations of $Cl^-$ and $PCl_3^{++}$ ions at the respective electrodes are decreased. Decreases in these ion concentrations increase the efficiency of the system and materially increase the open circuit potential which can be obtained. Thermodynamic calculations utilizing the free energies of the reactants and products indicate that the phosphorous trichloride-chlorine fuel cell has a theoretical open circuit voltage of 0.28 volt at 298° K. Such calculations utilize the difference in free energies of $PCl_5$ and $PCl_3$ and molecular chlorine, because the energy of dissociation of molecular chlorine to atomic chlorine is not available to the reaction. For such a fuel cell system, the theoretical efficiency is calculated to be 44%. Actually, the open circuit potential of fuel cells in accordance with the invention may very well be higher than 0.28 volt. Using the Nernst equation, the potential is expected to increase .02 volt for each factor of 10 increase in total pressure. As discussed above in conjunction with FIG. 2, the pressure may be maintained at any selected level within the dissociation chamber 20, to be above 1 atmosphere if desired. Additionally, the Nernst equation requires that the potential increase by .06 volt for each factor of 10 decrease in ion concentrations (here $Cl^-$ and $PCl_3^{++}$) at the electrodes. The strong ionization of the $PCl_5$ in the solvent selected thus permits an increase on this account as well.

Another increase in the efficiency of the system is derived from the combined use of the heat exchanger 16 and the heat rejector 35 in lowering the temperature of the dissociated constituent fuels prior to their entry into the fuel cell 10. The heat exchange process may also be viewed as regenerative, and increases the efficiency of the fuel cell system because the required heat input per unit of electrical energy output is decreased.

It is preferred to employ electrodes, such as porous nickel, with a relatively small average pore diameter of approximately 20 microns. The smaller pore diameter assists in compensating for pressure fluctuations in the feeding of the fuels, and prevents the penetration of $PCl_3$ or $Cl_2$ into the electrolyte zone, which might cause a direct reaction between the constituent fuels and a consequent plugging of the electrode pores and electrode flooding problems due to the coating of the catalytic surface of the electrodes by inert materials. An important factor and advantage in these systems is that the regenerative action is adequately carried out with even relatively low dissociation efficiency. The non-dissociated constituents are merely recycled back into the system but because they may be separated out on the next cycle there is not a progressive decrease of constituent fuels. With less than fully efficient dissociation, therefore, there can be compensation for power loss by increasing electrode size, or like means, and the cycle remains continuous.

In another arrangement in accordance with the invention, referring now to FIG. 3, a regenerable fuel cell may utilize the photolytic dissociation of nitrosyl chloride. The reactions in this cell from which electrical energy is derived are as follows:

Anode: $2NO \rightarrow 2NO^+ + 2e^-$
Cathode: $Cl_2 + 2^- \rightarrow 2Cl^-$

The way in which the reaction products are dissociated into the constituent fuels is as follows:

$$2NOCl \rightarrow 2NO + Cl_2$$

The nitric oxide (NO) and the $Cl_2$ are fed to a fuel cell 50. A load 51 coupled across the electrodes of the fuel cell 50 derives the output electrical energy from the system. The regeneration cycle used in this arrangement utilizes the differential solubility of the NO and the $Cl_2$ in a solvent, such as $CCl_4$. NOCl and $Cl_2$ are soluble in $CCl_4$, whereas NO is not appreciably soluble in $CCl_4$. In a source chamber 53 for the $Cl_2$, therefore, the $Cl_2$ is maintained in solution in $CCl_4$, whereas in a source chamber 54 for the NO, the NO is maintained in the gaseous phase. On entry of the constituent fuels into the electrolyte, as the electrical energy is generated, therefore, the reaction product, NOCl, remains dissolved in the $CCl_4$.

Now in accordance with the present invention as shown in FIG. 3, the dissolved NOCl is fed through a dissociation chamber 56 in which the reaction product is dissociated into separated constituent fuels for return to the sources 53, 54. In order for the flow to be maintained uniform, a flow control device 57 may be coupled between the dissociation chamber 56 and the fuel cell 50. Similarly, the pressure control 59 may be coupled in the piping which carries the gaseous nitric oxide. Ultraviolet radiation from an external source is directed toward the dissociation chamber 56 through an optical system represented as a lens 60 and a filter 62 which concentrate the ultraviolet radiation and reject most radiant energy of other wavelengths.

Within the dissociation chamber 56 there is provided a serrated quartz plate 63 across which the NOCl in solution is caused to flow. The direction of flow is substantially normal to the direction of the serrations, and in a plane which is normal to the impinging ultraviolet radiation. Accordingly, the NOCl is thoroughly distributed for the photochemical transformation and fully dissociated into the constituent fuels during the flow across the serrated quartz plate 63. During this flow, the NO which is not soluble in the $CCl_4$, is separated out in the gaseous phase, particularly as it passes across the ridges and becomes caught under the serrations in the plate 63. The gas moves to the side of the dissociation chamber 56, into the venting, and then to the source chamber 54 for the NO. The $Cl_2$, which remains in solution in the $CCl_4$, flows out the bottom of the dissociation chamber 56 and is returned to the source chamber 53.

The arrangement of FIG. 3 is dependent upon gravity flow for control of the constituent fuels and the reaction product, and for separation of the dissociated components. In many situations, however, no appreciable gravitational force will be available for this purpose. If the entire mechanism is spun about a selected axis, however, centrifugal force can be employed in the same manner as the gravitational effect. Likewise, the liquids and gases may be fed to a centrifugal separator with the liquid being drawn off from the outside and the gases withdrawn from the center of the separator.

It should be noted that regenerable fuel cells need not be confined to fully closed systems. In accordance with the invention, the reaction products may be accumulated for dissociation by efficient high volume means. If the fuel cells are used in a vehicle, for example, exchangeable reaction product and fuel tanks may be replaced in a body without using the self-contained regeneration principle. Thereafter, the reaction products may be dissociated when convenient and economical.

While there have been described above and illustrated in the drawings various regenerable fuel cells utilizing thermal and photolytic dissociation mechanisms, it will be appreciated that a number of modifications and alternative forms are readily feasible. Accordingly, the invention should be considered to include all variations and alternative expedients falling within the scope of the appended claims.

What is claimed is:
1. A continuous cycle regenerable fuel cell operating at temperatures below 400° C. and comprising:
   (A) a fuel cell having two porous electrodes separating said cell into three separate chambers with two outer fuel chambers separated from a central combustion chamber;
   (B) means for supplying $PCl_3$ to one of said fuel chambers;
   (C) means for supplying $Cl_2$ to the second of said fuel chambers,
   (D) a solvent $POCl_3$ which remains in the liquid phase throughout the cycle at the operating temperatures and dissolves the reaction product $PCl_5$ forming an electrolyte in said central combustion chamber;
   (E) a thermal disassociation and separation chamber including means for applying radiant energy to the reaction product in said solvent for disassociation of said reaction product into said fuels;
   (F) a heat exchanger;
   (G) means for circulating said solvent from said combustion chamber through said heat exchanger to said disassociation chamber with said reaction product in solution; and
   (H) means for returning said solvent with $PCl_3$ in solution through said heat exchanger to one of said fuel chambers and returning $Cl_2$ through said heat exchanger to the other of said fuel chambers.

2. A regenerative electrochemical process of producing electrical power comprising the following steps:
   (A) providing a fuel cell with two spaced porous electrodes forming a combustion chamber therebetween;
   (B) supplying $PCl_3$ through one of said electrodes to said combustion chamber,
   (C) supplying $Cl_2$ through a second of said electrodes to said combustion chamber;
   (D) providing a disassociation chamber;
   (E) circulating a solvent $POCl_3$ through said combustion chamber and said disassociation chamber,
   said solvent dissolving the reaction product of combustion of said fuels $PCl_5$ and forming an electrolyte and also dissolving $PCl_3$,
   said solvent remaining in the liquid phase throughout the process;

(F) providing radiant energy to said disassociation chamber to regenerate $PCl_3$ and $Cl_2$ from the reaction product $PCl_5$.

References Cited by the Examiner

UNITED STATES PATENTS

| | | | |
|---|---|---|---|
| 2,925,454 | 2/1960 | Justi et al. | 136—86 |
| 3,031,518 | 4/1962 | Werner et al. | 136—86 |
| 3,100,163 | 8/1963 | Lyons | 136—86 |

OTHER REFERENCES

Proceedings, Thirteenth Power Sources Conference, Apr. 28, 1959, pages 122–124, U.S. Army Signal Research and Development Laboratory, Fort Monmouth, N.J.

WINSTON A. DOUGLAS, *Primary Examiner*.

JOSEPH REBOLD, JOHN H. MACK, *Examiners*.

H. FEELEY, *Assistant Examiner*.